United States Patent [19]

Casier et al.

[11] Patent Number: 4,640,458

[45] Date of Patent: Feb. 3, 1987

[54] METHOD OF PRODUCING HOT AIR AND HOT WATER FOR SANITARY PURPOSES AND APPARATUS FOR CARRYING OUT THE SAID METHOD

[75] Inventors: Yves Casier, Ermont; Philippe Cassagne, Paris; Sylvain Gicquel, Saint Denis; Roland Junet, Paris, all of France

[73] Assignee: Gaz de France, France

[21] Appl. No.: 756,312

[22] Filed: Jul. 18, 1985

[30] Foreign Application Priority Data

Jul. 25, 1984 [FR] France .................. 84 11816

[51] Int. Cl.$^4$ .............................................. F24H 3/06
[52] U.S. Cl. ...................................... 237/17; 126/101
[58] Field of Search ............................ 237/16, 19, 55; 126/101; 122/17

[56] References Cited

U.S. PATENT DOCUMENTS 4,531,509  7/1985  Wilhelm, Jr. .................. 122/17

FOREIGN PATENT DOCUMENTS

| 108194 | 6/1967 | Denmark .......................... 237/55 |
| 0021469 | 1/1981 | European Pat. Off. . |
| 1114997 | 10/1961 | Fed. Rep. of Germany . |
| 2419398 | 11/1975 | Fed. Rep. of Germany ........ 237/55 |
| 2742073 | 3/1979 | Fed. Rep. of Germany . |
| 917010 | 1/1963 | United Kingdom . |

Primary Examiner—Henry Bennett

[57] ABSTRACT

The present invention relates to a method and an apparatus for producing hot air and hot water for the supply of sanitary fittings, the apparatus comprising on the one hand, a central portion reserved for the sanitary water containing a reheating exchanger and a pre-exchanger associated with a cold-water intake circuit, and, on the other hand, a casing completely surrounding the central portion and defining therewith an annular space containing an exchanger for heating the blown air by counterflow heat-exchange with the products of combustion issued from a burner.

5 Claims, 1 Drawing Figure

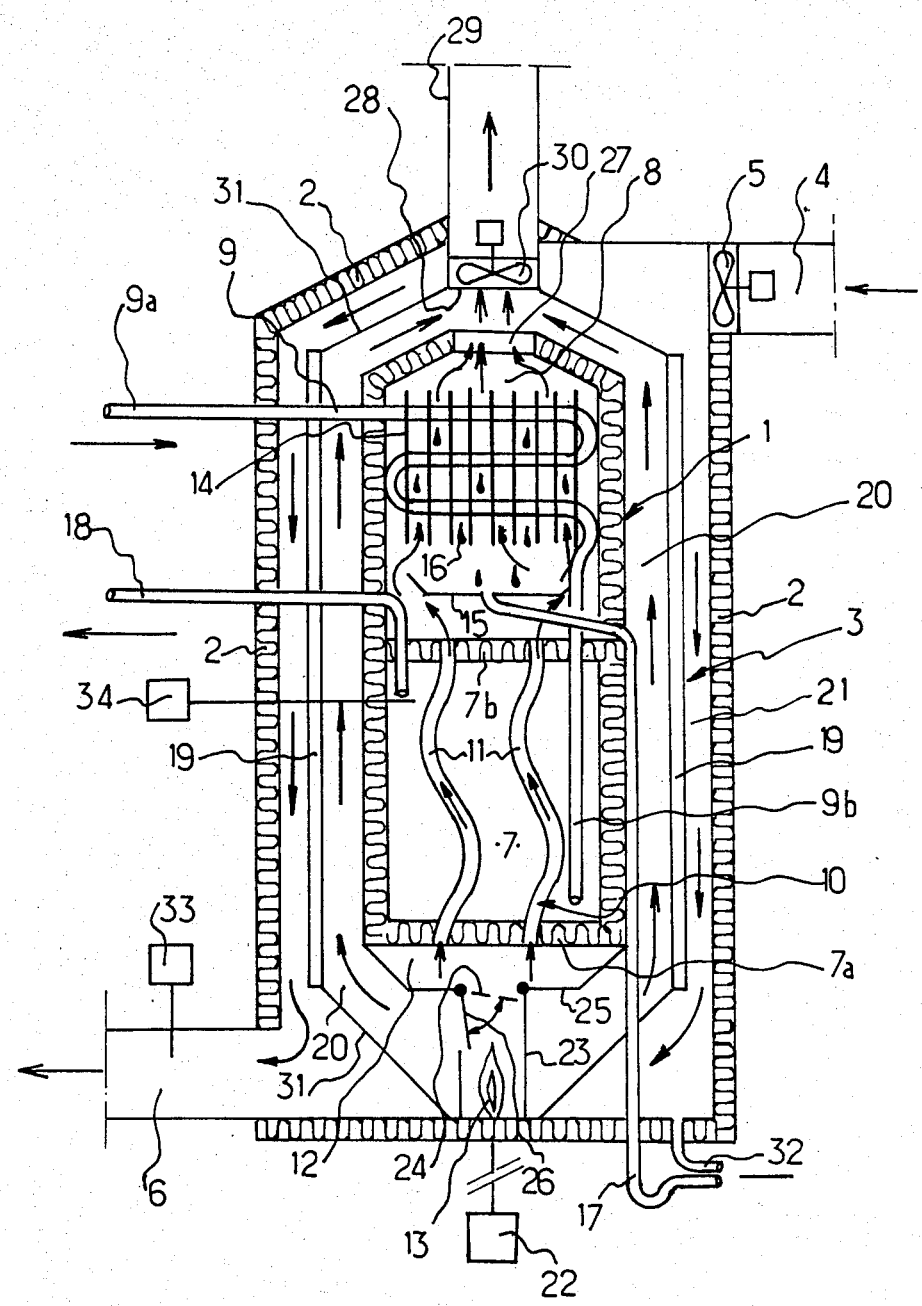

4,640,458

METHOD OF PRODUCING HOT AIR AND HOT WATER FOR SANITARY PURPOSES AND APPARATUS FOR CARRYING OUT THE SAID METHOD

BACKGROUND OF THE INVENTION

The present invention has essentially for a subject matter a method of producing hot air and hot water for the supply of sanitary fittings.

It is also directed to an apparatus for carrying out the said method and capable of producing such air and water for use in dwellings, houses, rooms or any like spaces.

It has already been proposed to heat rooms, e.g. for dwelling purposes, by means of installations producing blown hot air. On the other hand, it is already known to produce hot water for sanitary purposes by means of reservoirs or the like heated with gas or electricity. But it has not hitherto been proposed to combine both functions of heating with hot air and of production of hot water for sanitary purposes into a unit apparatus performing the two functions independently of one another, using simple means, occupying minimum space and capable of being manufactured at low cost.

SUMMARY OF THE INVENTION

Consequently, the present invention has for an object to fill this gap by providing a new type of hot-air heating apparatus which also allows producing hot water for sanitary purposes and offering the abovementioned advantages among others.

To this end, the invention generally has for a subject matter a method of producing hot air and hot water for the supply of sanitary fittings, characterized in that, in a same apparatus equipped with at least one burner, there is performed a heating of the air blown through the said apparatus by counterflow heat-exchange with the combustion products of the burner, and there is performed independently a heating of the water for sanitary purposes by heat exchange with the said combustion products.

According to another feature of the method of the invention, the water for sanitary purposes is heated by heat exchange between the water stored and the combustion products issued from the burner, and the combustion products are re-used for preheating the cold water intake with concomitant condensation.

The invention is also directed to an apparatus for producing hot air and hot water for the supply of sanitary fittings, for carrying out the above method, said apparatus being characterized essentially by a central portion reserved for the water for sanitary purposes and containing at least one exchanger, and by a casing completely surrounding the said central portion and defining between itself and the latter an annular space containing at least one other exchanger for the production of hot air and connected to at least one burner mounted within the lower portion of the said casing.

According to another feature of the apparatus, the said central portion includes a first exchanger extending right through a storage tank for the sanitary water and a pre-exchanger arranged on a cold-water intake circuit located in a chamber or the like above the said tank.

Furthermore, said first exchanger is constituted by conduits opening on the one hand into the lower portion of the tank towards a space for collecting the combustion products issued from the burner, and on the other hand, into the upper portion of the tank, namely, the aforementioned chamber, below a condensate collector which itself is arranged below the pre-exchanger associated with the cold-water intake circuit.

According to still another feature of the invention, the exchanger for the production of hot air is constituted by a finned wall arranged concentrically around the central portion and forming with the latter a first annular passageway for the products of combustion issued from the burner, whereas a second annular passageway is formed between the said finned wall and the aforesaid casing for the air blown by at least one fan mounted in the said second passageway.

The said wall may advantageously contain a certain mass of liquid to provide a modulation of the output temperature of the hot air produced by the apparatus.

According to still another feature of the invention, the combustion products issued from the burner are directed by a duct opening into the collecting space under the aforesaid tank and provided with a hinged flap for directing the combustion products either towards said first exchanger or towards the said first passageway.

The apparatus of the invention is also characterized by a first opening provided in the upper portion of the said chamber and by a second opening provided in the said first passageway, the said second opening being in axial alignement with the said first opening and a chimney or the like extending in prolongation of the latter and being equipped with at least one fan for extracting the products of combustion flowing through the aforesaid central portion and the said first passageway.

According to still another feature, the condensate collector in the aforesaid chamber communicates through a discharge conduit with the external atmosphere, and another condensate discharge conduit communicates with the said second passageway in the lower portion of the casing.

Furthermore, the cold water intake circuit opens into the storage tank which is provided with an aquastat and with an outlet conduit for conveying the sanitary hot water to, for example, a shower room, bathroom or the like.

BRIEF DESCRIPTION OF THE DRAWING

Other features and advantages of the invention will appear more clearly as the following detailed description proceeds with reference to the appended single drawing given solely by way of example and representing a diagrammatic elevational and axial sectional view of a hot-air and sanitary hot-water generator designed according to the principle of the invention.

DESCRIPTION OF THE PREFERRED EMBODIMENTS

Referring to the drawing, it is seen that the apparatus includes essentially a central, e.g. cylindrical, portion 1 reserved for the heating and reheating of the water for sanitary purposes, and a casing 2 completely surrounding the central portion 1 and defining between itself and the latter an annular space 3 in which there takes place the heating of the air drawn at 4 from any room and blown by means of a fan 5, before leaving through the outlet conduit 6.

The central portion 1 constitutes an assembly which is heat-insulated from the peripheral casing 2 which itself is insulated from the outside as clearly seen in the FIGURE.

In the example of embodiment illustrated, the central portion 1 in which the production of sanitary hot water takes place includes a hot-water storage tank 7 above which is located a chamber or the like 8 through which passes a cold-water tube 9 which enters the apparatus at 9a and opens into the tank 7 at 9b.

Through the tank 7 runs a first exchanger 10 which, more precisely, consists of sinuous conduits or tubes 11 opening, on the one hand, at the lower portion 7a of the tank 7 into a collector space 12 receiving the products of combustion from a burner 13, and on the other hand, at the upper portion 7b of the tank 7 into the chamber 8 containing the cold-water intake tube 9. With the circuit 9 is associated a pre-exchanger 14 below which is arranged a collector 15 for the condensates 16 which are discharged therefrom through a conduit 17 and out of the heat-insulating casing 2. At 18 is shown a hot-water outlet conduit 18 communicating with the stored water tank 7.

The annular space 3 reserved for the production of hot air contains an exchanger 19 constituted by a finned wall arranged concentrically around the central portion 1. Thus, the exchange wall 19 forms between itself and the outer periphery of the central portion 1 a first annular passageway 20 for the combustion products issued from the burner 13, whereas a second annular passageway 21 is formed between the wall 3 and the casing 2 for the circulation of the blown air to be distributed at 6 after being heated by counterflow heat-exchange with the combustion products in the first passageway 20, as shown by the arrows in the drawing.

As is known per se, the burner 13 is connected to an ambient-air thermostat 22. Combustion products from this burner are conveyed through a conduit 23 opening at 24 into the collecting space 12 constituted by a wall or metal plate 25 associated with the lower portion 7a of the stored water tank 7. The conduit 23 is equipped with a hinged flap 26 allowing the combustion products to be directed either towards the exchanger 10 or towards the annular passageway 20.

At the top of chamber 8 is provided an opening 27 for the discharge of the products of combustion flowing through the exchanger 10 and the pre-exchanger 14 associated with the cold-water intake circuit 9. An opening 28 in axial alignment with the opening 27 is also provided in the passageway 20 to allow the discharge of the combustion gases having served to heat the blown air. The opening 28 constitutes the inlet of a chimney 29 equipped with an extraction fan 30.

It should be noted that the annular passageways 20, 21 separated by the exchange wall 3 are closed at their top and bottom, e.g. by metal plates 31, the aforementioned opening 28 being provided in the upper metal plate 31 of the chimney 29.

There is shown at 32 a discharge conduit for the condensates produced in the passageway 21 for the blown and heated air. Lastly, an airstat 33 is provided on the hot-air outlet conduit 5 and an aquastat 34 is mounted on the hot-water storage tank 7.

The operation of the heating apparatus of the invention is readily inferred from the foregoing description.

Production of hot water for sanitary purposes is semi-instantaneous. The aquastat 34 maintains the water temperature within a range of about 55° to 65° C. When this temperature reaches 55° C., the aquastat starts the burner 13. The combustion gases flow through the conduits 11 of the exchanger 10, whereafter, at the outlet of the latter, the combustion gases are re-utilized and flow through the pre-exchanger 14 in counterflow relationship to the cold-water intake 9, whereafter the combustion gases are finally discharged through the chimney 29. It will be understood that the plate heat-exchanger 14 greatly improves the amount of sanitary hot-water produced, because, particularly, of the condensation during the drawings.

Worthwhile mentioning here is the fact that the stored water tank 7 may have a capacity of about 30 liters, that the exchange area of the pre-exchanger 14 is of the order of a few square meters and that the useful power of the burner 13 is of the order of 18 kilowatts.

But it is perfectly possible, without departing from the scope of the invention, to simply use for the central portion 1 a water storage tank of a capacity in the range of approximately 80 to 100 liters, with the useful power of the burner 22 being of the order of 14 kilowatts.

Lastly, as regards the production of hot water, it will be noted that the hinged flap 26 ensures the priority of this production. As for the production of hot air, it takes place through the passageway 21, as explained previously, i.e., by counterflow heat-exchange with the products of combustion circulating through the passageway 20 and discharged through the chimney 29 which thus serves to discharge combustion gases for the reheating of the water for sanitary purposes.

The regulation of the heating function which, as already pointed out, is independent of the production of sanitary hot water is performed by means of the thermostat 22 and the airstat 33.

The thermostat 22 which is located in the room of the dwelling in which the thermal conditions are most unfavourable controls the burner 13 in on-off mode, thus ensuring the heating by blown air at about 40° C. The hot-air blowing fan 5 is controlled by the airstat 33 and is switched off in case the temperature of the air reaches a minimum value, e.g. of the order of 25° C.

The control considered here, therefore, is a control of the flow in the on-off mode, but the production may also perfectly be contemplated of hot air with a certain temperature modulation.

To this end, a modulating burner can be used for the heating, e.g. a burner with a maximum useful power of the order of 6 kilowatts and capable of being modulated down to 2 kilowatts, the said burner being controlled by the thermostat. In this case, use can be made of a second burner with a useful power in the range of about 14 to 18 kilowatts and specially intended for heating the water for sanitary purposes.

Thus, by using a modulating burner for the heating, the temperature of the air can be modulated and regulated accurately according to the needs, at values ranging from about 40° to 25° C. for a same blowing flow-rate.

However, in order to avoid the use of two burners as explained above, and also to overcome certain difficulties arising from the use of a modulating burner, the temperature modulation of the hot blown air may be obtained merely by increasing the inertia of the heat exchager 19. For example, this inertia may be increased by incorporating in said exchanger a certain mass of a liquid such as for example water.

This would allow obtaining an important temperature modulation at the hot-air outlet 6, resulting in an improvement in comfort and in a better recovery of the solar and internal inputs, since the mean rate of flow of the recycled air would be greater for a same supply of heat. Lastly, owing to the condensation which takes place in both cases, i.e., heating and hot water production for sanitary purposes, the efficiencies obtained are high.

Of course, the invention is by no means limited to the form of embodiment described, which has been given by way of example only.

For instance, instead of the package design of the two functions of heating and sanitary hot-water production shown in the drawing, an arrangement could perfectly be contemplated, without departing from the scope of the invention, in which the two functions would be performed in two adjacent box-shaped casings, the principle of the invention being based essentially on the fact that the two functions are combined into a single apparatus and performed independently of one another.

The invention therefore includes all technical equivalents to the means described as well as their combinations if the latter are carried out according to its gist.

What is claimed is:

1. An apparatus for producing hot air and hot water for the supply of sanitary fittings, comprising the combination of:
   a heat-insulated central portion or casing (1) for the heating of sanitary water, including a water storage tank (7) and a chamber (8) located above said tank which comprises a lower portion (7a) and an upper portion (7b) above which said chamber is situated;
   a first exchanger (10) located in said tank and including sinuous tube means (11) which opens at the upper portion (7b) of said tank into said chamber;
   a pre-exchanger (14) disposed inside said chamber and a cold-water intake tube (9) associated with said pre-exchanger, extending through said chamber and opening into said tank;
   a heat-insulated external casing (2) completely surrounding the central portion of the apparatus and defining therewith an annular space (3) which contains a second exchanger (19) including a finned wall arranged concentrically around said central portion and forming a first annular passageway (20) between said finned wall and said central portion (1), and a second annular passageway (21) between said wall and said external casing (2);
   duct means (4,6) connected to said external casing and adapted to blow air through said second passageway (21);
   a burner (13) and a conduit (23) associated with said burner and communicating with said tube means, for conveying the combustion gas through said sinuous tube means (11) inside said tank and through said chamber (8) above said tank;
   flap means (26) hinged onto said conduit (23) for directing the combustion gas either towards said sinuous tube means and chamber for heating the stored water or towards said first passageway (20) for heating the blown air passing through said second passageway (21) by counterflow heat exchange with the combustion products flowing in said first passageway; and
   openings (27,28) provided in said chamber (8) and said first passageway (20) respectively, for discharging the combustion gas flowing either through said central portion (1) or through said first passageway (20).

2. An apparatus according to claim 1, which further comprises
   a collecting space (12) provided under the lower portion (7a) of said tank (7) and connected to said conduit (23) associated with the burner (13) and with said tube means (11).

3. An apparatus according to claim 1, which further comprises
   a collector (15) for condensate (16) disposed under said pre-exchanger (14) in said chamber (8) and including a discharge conduit (17) communicating with the exterior of the apparatus.

4. An apparatus according to claim 1, which further comprises
   a chimney (29) connect to said opening (28) provided in said first passageway (20) and which is substantially in axial alignment with said opening (27) provided in said chamber (8).

5. An apparatus according to claim 4, wherein said annular space (3) comprises metal plates (31) closing said passageways (20,21) at the top and bottom of the apparatus, with said opening (28) connected to said chimney (29) being provided in said metal plate..

* * * * *